(12) United States Patent
Singhal et al.

(10) Patent No.: US 12,380,394 B2
(45) Date of Patent: Aug. 5, 2025

(54) METHODS AND SYSTEMS TO CREATE CLUSTERS IN AN AREA

(71) Applicant: DISTA TECHNOLOGY PRIVATE LIMITED, Pune (IN)

(72) Inventors: Akshay Kumar Singhal, Pune (IN); Deepak Garg, Pune (IN); Nishant Kumar, Pune (IN); Shishir Gokhale, Pune (IN)

(73) Assignee: DISTA TECHNOLOGY PRIVATE LIMITED, Pune (IN)

( * ) Notice: Subject to any disclaimer, the term of this patent is extended or adjusted under 35 U.S.C. 154(b) by 0 days.

(21) Appl. No.: 18/584,284

(22) Filed: Feb. 22, 2024

(65) Prior Publication Data

US 2024/0193531 A1    Jun. 13, 2024

Related U.S. Application Data

(63) Continuation of application No. 18/485,521, filed on Oct. 12, 2023.

(30) Foreign Application Priority Data

Oct. 14, 2022    (IN) .............................. 202221058708

(51) Int. Cl.
G06Q 10/083    (2024.01)
G06Q 30/0204   (2023.01)

(52) U.S. Cl.
CPC ....... *G06Q 10/083* (2013.01); *G06Q 30/0205* (2013.01)

(58) Field of Classification Search
CPC .......................................... G06Q 10/00–50/00
(Continued)

(56) References Cited

U.S. PATENT DOCUMENTS

| 6,438,579 B1 * | 8/2002 | Hosken .................. | G06Q 30/02 |
| | | | 707/999.005 |
| 6,892,178 B1 * | 5/2005 | Zacharia ................ | G06Q 30/02 |
| | | | 705/7.29 |

(Continued)

FOREIGN PATENT DOCUMENTS

| CN | 109522923 A | 3/2019 |
| CN | 111401935 A | 7/2020 |
| CN | 113344353 A | 9/2021 |

OTHER PUBLICATIONS

Liu, Fagui, and Zhijie Zhang. "Adaptive density trajectory cluster based on time and space distance." Physica A: Statistical Mechanics and its Applications 484 (2017): 41-56. (Year: 2017).*

(Continued)

*Primary Examiner* — Alan S Miller
(74) *Attorney, Agent, or Firm* — FisherBroyles, LLP; Susan M. Oiler

(57) ABSTRACT

A system and a method to create clusters in an area. The system comprises obtaining a plurality of location data points associated with a plurality of entities in an area. It may be noted that each location data point includes geographic coordinates. Further, the system comprises computing a range of location data points required in each cluster. Furthermore, the system comprises forming a farthest point cluster by determining a farthest location data point from a centroid based on an angular distance. It may be noted that the farthest point cluster comprises a set of location data points having a farthest distance lesser than a centroid distance. The system iteratively forms a new farthest point cluster by excluding the set of location data points present in the farthest point cluster from the plurality of location data points.

10 Claims, 9 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,996,572 | B1* | 2/2006 | Chakrabarti | G06F 16/9538 |
| | | | | 707/999.102 |
| 7,155,401 | B1* | 12/2006 | Cragun | G06Q 30/0254 |
| | | | | 705/14.1 |
| 7,440,943 | B2* | 10/2008 | Grasso | G06F 16/93 |
| | | | | 707/999.006 |
| 7,908,183 | B2* | 3/2011 | Jacobi | G06Q 30/0633 |
| | | | | 705/26.7 |
| 8,352,331 | B2* | 1/2013 | Dunning | G06F 16/40 |
| | | | | 705/26.7 |
| 8,874,477 | B2* | 10/2014 | Hoffberg | G06Q 20/065 |
| | | | | 705/37 |
| 9,818,136 | B1* | 11/2017 | Hoffberg | G07F 17/323 |
| 9,953,372 | B1* | 4/2018 | Dziabiak | G06Q 40/08 |
| 10,242,019 | B1* | 3/2019 | Shan | G06N 7/01 |
| 10,347,365 | B2* | 7/2019 | Wong | G16B 40/30 |
| 10,867,000 | B2* | 12/2020 | Ahlstrom | G06F 16/9535 |
| 10,909,442 | B1* | 2/2021 | Szarvas | G06N 3/08 |
| 10,936,620 | B2 | 3/2021 | M et al. | |
| 11,360,987 | B2* | 6/2022 | Jain | G06F 16/288 |
| 11,539,657 | B2* | 12/2022 | Rapaport | H04L 67/306 |
| 2001/0016906 | A1* | 8/2001 | Brebner | G06F 16/972 |
| | | | | 713/150 |
| 2001/0034631 | A1* | 10/2001 | Kiselik | G16H 10/20 |
| | | | | 705/37 |
| 2002/0183966 | A1* | 12/2002 | Mishra | G06F 18/23 |
| | | | | 702/179 |
| 2003/0182310 | A1* | 9/2003 | Charnock | G06F 16/38 |
| 2004/0215607 | A1* | 10/2004 | Travis, Jr. | G06F 16/9538 |
| 2006/0129595 | A1* | 6/2006 | Chen | G06F 16/283 |
| | | | | 707/999.102 |
| 2006/0242140 | A1* | 10/2006 | Wnek | G06F 16/355 |
| | | | | 707/999.005 |
| 2007/0087756 | A1* | 4/2007 | Hoffberg | G06Q 10/06375 |
| | | | | 455/450 |
| 2007/0208613 | A1* | 9/2007 | Backer | G06Q 10/107 |
| | | | | 702/182 |
| 2014/0025673 | A1* | 1/2014 | Sinha | G06Q 10/101 |
| | | | | 707/E17.014 |
| 2014/0172576 | A1* | 6/2014 | Spears | G06Q 30/0266 |
| | | | | 705/14.63 |
| 2018/0336638 | A1* | 11/2018 | Dziabiak | G06F 7/08 |
| 2019/0080001 | A1* | 3/2019 | Tylenda | G06F 16/93 |
| 2019/0108217 | A1* | 4/2019 | Chen | G06F 40/289 |
| 2020/0089786 | A1* | 3/2020 | Cheng | G06Q 30/0205 |
| 2021/0149858 | A1* | 5/2021 | Xia | G06F 16/287 |
| 2022/0198544 | A1* | 6/2022 | Feng | G06N 3/045 |
| 2022/0343190 | A1* | 10/2022 | Kwok | G06F 3/0482 |
| 2022/0398261 | A1* | 12/2022 | Charania | G06F 16/2456 |

OTHER PUBLICATIONS

Uppada, Santosh Kumar. "Centroid based clustering algorithms—A clarion study." International Journal of Computer Science and Information Technologies 5.6 (2014): 7309-7313. (Year: 2014).*

Han, Jiawei, Micheline Kamber, and Jian Pei. "Data mining concepts and techniques third edition." University of Illinois at Urbana-Champaign Micheline Kamber Jian Pei Simon Fraser University (2012) pp. 83-124. (Year: 2012).*

* cited by examiner

METHODS AND SYSTEMS TO CREATE CLUSTERS IN AN AREA

PRIORITY INFORMATION

The present application is a continuation of U.S. application Ser. No. 18/485,521, filed Oct. 12, 2023, which claims priority to Indian Application No. 202221058708 filed Oct. 14, 2022.

TECHNICAL FIELD

The present subject matter described herein, in general, relates to creating clusters in a geographic area, and, more particularly, to creating clusters comprising an equal number of entities.

BACKGROUND

In recent years, businesses are increasingly adopting direct selling models, i.e. providing products and services in non-retail settings. As a result, they rely more and more on technology for customer segmentation and distribution. For instance, a food delivery service that serves a large network of customers relies on conventional clustering models to group customers into clusters in order to assign food orders to the nearest delivery agent. In addition, conventional clustering models have a tendency to produce overlapping clusters in a given region.

Moreover, overlapping clusters may lead to issues such as improper allocation. In the given example, the food delivery service may adhere to a delivery time limit of 30 minutes after receiving an order from a customer. However, the delivery executive may receive a notification to deliver food to a location that is quite distant from his or her current location. This may have occurred because the clustering algorithm improperly assigned the order to the agent due to a cluster overlap. In such cases, the food may not be delivered within the allotted time, resulting in poor customer service.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for creating clusters in an area. This summary is not intended to identify essential features of the claimed subject matter nor is it intended for use in determining or limiting the scope of the claimed subject matter.

In one implementation, a method for creating clusters in an area is disclosed. The method involves obtaining a plurality of location data points corresponding to a plurality of entities such as user devices in an area. A location data point represents a geographic location of an entity referenced by geographic coordinates. Further, a range of location data points required in each cluster may be computed based on metadata related to an organization. Subsequently, the method may comprise determining a centroid of the plurality of location data points present in the area. Further, an angular distance of each of the plurality of location data points from the centroid may be calculated. Furthermore, a farthest location data point from the centroid may be determined based on the angular distance. Subsequently, a centroid distance between each location data point and the centroid, and a farthest distance between each location data point and the farthest location data point may be identified. Further, a first set of location data points having the centroid distance lesser than the farthest distance may be identified. Furthermore, a centroid cluster comprising the first set of location data points may be created. Subsequently, a second set of location data points having the farthest distance lesser than the centroid distance may be identified. Further, a farthest cluster comprising the second set of location data points may be created. It may be noted that the number of location data points in the farthest cluster meets the computed range of location data points. Furthermore, the method may comprise iteratively forming a new farthest point cluster by excluding the second set of location data points from the plurality of location data points. In one aspect, the aforementioned method for creating clusters in an area may be performed by a processor using programmed instructions stored in a memory.

In another implementation, a non-transitory computer readable medium embodying a program executable in a computing device for creating clusters in an area is disclosed. The program may comprise a program code for obtaining a plurality of location data points corresponding to a plurality of entities such as user devices in an area. A location data point represents a geographic location of an entity referenced by geographic coordinates. Further, the program may comprise a program code for computing a number of location data points required in each cluster based on metadata related to an organization. Furthermore, the program may comprise a program code for determining a centroid of the plurality of location data points present in the area. Subsequently, the program may comprise a program code for calculating an angular distance of each of the plurality of location data points from the centroid. Further, the program may comprise a program code for determining a farthest location data point from the centroid based on the angular distance. Furthermore, the program may comprise a program code for identifying a centroid distance between each location data point and the centroid, and a farthest distance between each location data point and the farthest location data point. Subsequently, the program may comprise a program code for identifying a first set of location data points having the centroid distance lesser than the farthest distance. The program may comprise a program code for creating a centroid cluster comprising the first set of location data points. The program may comprise a program code for identifying a second set of location data points having the farthest distance lesser than the centroid distance. The program may comprise a program code for creating a farthest cluster comprising the second set of location data points. It may be noted that the number of location data points in the farthest cluster is limited to a numerical value that is neither above nor below the determined numerical range. The program may comprise a program code for iteratively forming a new farthest point cluster by excluding the second set of location data points from the plurality of location data points.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for creating clusters in an area disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
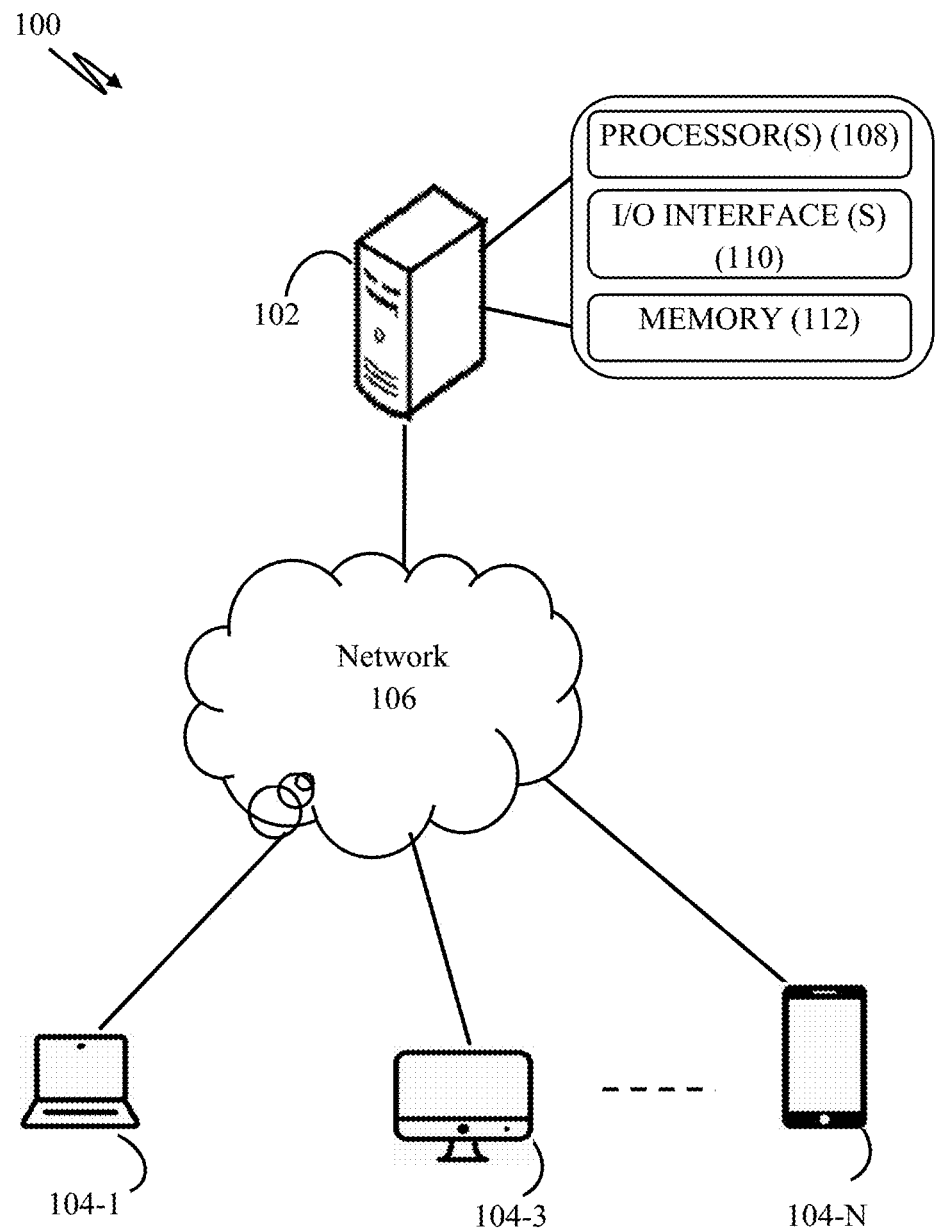
FIG. 1 illustrates a network implementation for creating clusters in an area, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "obtaining," "computing," "forming," "determining," "calculating," "identifying," "creating," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for creating clusters in an area. The system receives data relating to a plurality of entities which need to be divided into multiple clusters. In an aspect, the entity is a user device, and the system receives location data points associated with user devices in a particular geographic area. It may be noted that each location data point represents a user/user device and includes geographic coordinates for that particular user device. Further, the system computes a target number of location data points required in each cluster. For example, the target number is a range in the order of 100-120 location data points per cluster. Further, the system identifies a centroid and the farthest point of the plurality of location data points. Subsequently, the system iteratively creates clusters based on calculating the distances of the plurality of data points with the centroid and the farthest point. It may be noted that the number of location data points in the cluster created each time is limited to a numerical value that is neither above nor below the determined numerical range. Further, the cluster comprises one or more location data points (depicting user or user devices) in the area.

It may be noted that the method and the system for creating clusters in an area is useful in customer segmentation and distribution. The system and the method suggested below may be used in multiple sectors such as Fast-moving consumer goods (FMCG), logistics, banking, hyperlocal delivery services and alike. The technique for creating the clusters is explained in detail with reference to FIG. 1 below.

Referring now to FIG. 1, a network implementation 100 of a system 102 for creating clusters in an area is disclosed. Initially, the system 102 may obtain a plurality of location data points associated with a user device in an area. In an example, the software may be installed on a user device 104-1. It may be noted that the one or more users may access the system 102 through one or more user devices 104-1, 104-3 . . . 104-N, collectively referred to as user devices 104, hereinafter, or applications residing on the user devices 104. The system 102 obtains a plurality of location data points associated with a user device in an area 104. Further, the system 102 may also receive a feedback from a user using the user devices 104. The feedback may be related to at least the range of the location data points and clusters. It may be noted that the feedback may be used to train the system 102 to create dense clusters in a geographical area.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for creating clusters in an area. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The system as described herein is configured to execute a set of instructions to dynamically create clusters of plurality of entity within a given geographic area. The system may obtain a plurality of location data points associated with a user device in an area. In an embodiment, the area may be a part of a town, a city, a country, or the world. In an example, the system may be deployed to create clusters in New York. It may be noted that each location data point includes geographic coordinates. The geographic coordinates comprise a longitude and a latitude coordinate of a location data point.

In an embodiment, the system may obtain the location data in real time from the user. In another embodiment, the system may receive the location data related to one or more users from an organization. In yet another embodiment, the location data received from the user may be dynamic. In other words, the system may track movement of the user in real time.

Further, the system 102 computes a range of location data points (entities) required in each cluster based on metadata related to an organization. It may be noted that the metadata may also be referred as clustering parameters. The metadata comprises at least information related to the area, a timeline for an activity, and a number of entities available in the area. In an embodiment, the number of entities may be a number of sales agents available in the area to serve the customers. In an example, the clustering process is performed to divide a plurality of available customer service agents such as delivery boys, or ground support staff into equal sized clusters within a geographic area so that there is no cluster that is over-manned nor under-manned. In another embodiment, the range of location data points may be provided directly by a user as an input to the system. In an example, the system may compute that the range of location data points required in each cluster is 50-60.

Consider an example, a bank wants to convert potential leads into customers. Let us assume that there are 20 sales representatives and about 1200 such leads available in a city. Further, the timeline to open the current bank account for the leads is 30 days. Based on this metadata, the system computes the number of leads (location data points) that will be added to each cluster. So, in this example, the quotient of 1200/20=60. Assuming that the potential leads are volatile and subject to change, the number of leads per cluster can be set as a range with a lower cut-off as 45-60 leads per cluster. Therefore, each sales representative will be attending to 45-60 leads. In another scenario, the system may also recommend recruiting or adding more sales representatives in a city based on a Machine Learning Algorithm. The Machine Learning Algorithm is trained based on the metadata and the range of location data points present in clusters in a similar area. Further, the machine learning algorithm is continuously updated based on a feedback, received from a user, related to at least the recommendation or the range of location data points. It may be noted that system is continuously learning and training based on the feedback received from the user related to at least the recommendation or the range of location data points, and thus, the efficiency of the system increases over time.

Further to computing the range, the system may determine a centroid of the plurality of location data points present in the area. The centroid is calculated by taking an arithmetic mean of longitudes and latitudes. In an example, the system may also use a k-means clustering algorithm to determine the centroid. It may be noted that the centroid is a point within the area or a real location data point representing the centre of the plurality of location data points present in the area. In an embodiment, the system may identify a location data point that has geographic coordinates that are closest to the calculated arithmetic mean.

Further, the system may calculate an angular distance of each of the plurality of location data points from the centroid. The angular distance is calculated using at least the Haversine distance formula, Euclidian distance formula, and Vincenty Formula. It may be noted that the angular distance between two location data points, present on the earth or a sphere, is calculated based on the longitudes and latitudes of two location data points. In an example, consider there are 100 location data points. The system may calculate the angular distance between each location data point and the centroid. The system may calculate 100 angular distances in real time. In another embodiment, when the centroid is the real location data point, in that scenario, the system may calculate 99 angular distances.

Subsequently, the system may also compute an average angular distance between the plurality of location data points from the centroid. Further, the system may determine a minimum outlier threshold by identifying a number of points having the angular distance greater than a threshold average angular distance. It may be noted that the threshold average angular distance may be calculated automatically. In another embodiment, the user may define the threshold average angular distance in multiples of average angular distance.

In the above example, let us assume that the average angular distance between 100 location data points is 5. Further, let us assume that the threshold average angular distance is 10. Further, the system identifies a number of points having the angular distance greater than the threshold average angular distance (10). It may be noted that the location data points having the angular distance greater than the threshold average angular distance are called outlier points. Let us assume that the angular distance of 15 location data points is greater than 10. The system may define 15 as the minimum outlier threshold.

In an embodiment, when the farthest point cluster comprises less than 15 points, the system may remove the outlier points from further analysis. After removing the outlier points, the system 102 may redetermine a centroid of the plurality of location data points (by ignoring the outlier points) present in the area.

Further to determining the minimum outlier threshold, the system may determine a farthest location data point from the centroid based on the angular distance. As explained in the above example, after calculating the angular distance between each location data point and the centroid the system may determine a farthest location data point. In an example and not by way of any limitation, the system may identify more than one location data points having same farthest distance from the centroid. Further, the system randomly selects a location data point as a farthest location data point. In an embodiment, the system may automatically highlight the centroid and the farthest location data point on an interface.

Furthermore, the system may identify a centroid distance between each location data point and the centroid, and a farthest distance between each location data point and the farthest location data point. Referring to the above example of 100 location data points, the system may identify a centroid distance between each location data point and the centroid. Similarly, the system may identify a farthest distance between each location data point and the farthest location data point. In other words, the system may identify 100 centroid distances and 100 farthest distances.

Subsequently, the system may identify a first set of location data points having the centroid distance lesser than the farthest distance. In other words, the system may identify the first set of location data points that are close to the centroid when compared to the farthest location data point. In an example and not by way of any limitation, the system at the backend may create a table comprising first set of location data points having the centroid distance lesser than the farthest distance.

TABLE A

A first set of location data points having the centroid distance lesser than the farthest distance

| Location Data Points | Centroid Distance | Farthest Distance |
|---|---|---|
| A | 1 | 10 |
| B | 2 | 9 |
| C | 3 | 8 |
| D | 4 | 5 |

Further, the system may create a centroid cluster comprising the first set of location data points. In the above example, the system may create a centroid cluster comprising location data points A, B, C and D.

Further to creating a centroid cluster, the system may identify a second set of location data points having the farthest distance lesser than the centroid distance. In other words, the system may identify the second set of location data points close to the farthest location data point when compared to the centroid. In an example and not by way of any limitation, the system at the backend may create a table comprising second set of location data points having the farthest distance less than the centroid distance.

TABLE B

A second set of location data points having the farthest distance less than the centroid distance

| Location Data Points | Farthest Distance | Centroid Distance |
|---|---|---|
| P | 1 | 10 |
| Q | 2 | 9 |
| R | 3 | 8 |
| S | 4 | 5 |

Subsequently, the system may create the farthest point cluster comprising the second set of location data points. It may be noted that number of location data points present in the farthest point cluster meets the range of location data points. In the above example, the system may create the farthest point cluster comprising the location data points P, Q, R, and S.

It may be noted that the second set of location data points are removed from the farthest point cluster when the number of points in the farthest point cluster is less than the minimum outlier threshold.

Consider an example, a total number of location data points present in an area is 1000. Let us assume that the system computes the range of location data points in a cluster as 45-50. So, the system has to divide the location data points into at least 20 clusters. Further, the system determines the angular distance of the plurality of location data points (1000) from the centroid. Furthermore, the system computes the average angular distance between the plurality of location data points from the centroid. Let us assume that the average angular distance is 8 km, and the threshold average angular distance is 24 km. Subsequently, based on the threshold average angular distance, the system determines that the minimum outlier threshold is 25. Further, the system determines the farthest location data point from the centroid. Let us assume that the farthest location data point X is 20 km away from the centroid. Further, the system determines the centroid distance between each location data point and the centroid, and the farthest distance between each location data point and the farthest location data point. Furthermore, the system identifies the first set of location data points. Let us assume that the first set of location data points comprises 800 location data points. The system then creates a centroid cluster comprising 800 location data points. Further, the system identifies the second set of location data points. Let us assume that the second set of location data points comprises 200 location data points. The system creates the farthest point cluster comprising 200 location data points. It may be noted that the computed range for the cluster is 45-50. Thus, the farthest cluster comprises 150-155 additional points. Further, the system may remove the additional 150-155 location data points from the farthest cluster in order to create the farthest cluster of 45-50 points. Instance II present below explains the removal of additional points from the farthest cluster.

Referring to the above example, the minimum outlier threshold is 25. In another instance, let us assume that the centroid cluster comprises 980 location data points and the farthest cluster comprises 20 location data points. The system removes the 20 location data points present in the farthest location data point.

Instance I:

In another instance, the system may determine that the number of location data points present in the farthest point cluster is less than the range of location data points. In such a scenario, the system may identify a difference in the number of location data points in the farthest point cluster and the determined range of location data points. Let us assume that the determined range of location data points is 45-50 and the minimum outlier threshold is 20. If the farthest point cluster comprises 40 location data points, then the system identifies the difference as 5-10 location data points. In order to make up for this difference (i.e., shortage), the system sorts the first set of location data points present in the centroid cluster in the ascending order of their farthest distance. Let us assume that the centroid cluster comprises 300 location data points. The system sorts the 300 location data points with the location data point with the lowest farthest distance first, followed by the location data points in the increasing order of farthest distance. Upon sorting the location data points, the system selects "n" number of the sorted location data points present in the centroid cluster, where "n" is the difference. In other words, the system selects the top 5 location data points present in the sorted list of location data points in the centroid cluster having the first 5 lowest farthest distance. In the given example, the system adds the selected 5 location data points from the centroid cluster to the farthest point cluster to make up for the shortage in location data points. Thus, the farthest point cluster comprises 45 points and the centroid cluster comprises 295 points.

Instance II:

In yet another instance, the system may determine that the number of location data points present in the farthest point cluster is more than the range of location data points. In such a scenario, the system may compute a number of additional location data points present in the farthest cluster based on the range of location data points. Let us assume that the computed range of location data points is 45-50 and the minimum outlier threshold is 20. If the farthest point cluster comprises 65 points, then the system computes the additional location data points (15 location data points) in the farthest cluster. In order to make up for the excess points, the system sorts the second set of location data points in the descending order of their farthest distance. In the example, the system sorts 65 location data points present in the farthest point cluster with the location data point having the highest farthest distance first, followed by location data points in the decreasing order of farthest distance. Further, the system removes top "n" number of location data points from the sorted location data points in the farthest point cluster, where "n" is the number of additional location data points. In the example, the system will remove 20 points (65-45) having a higher farthest distance from the farthest point cluster. Thus, obtaining a farthest point cluster comprising 45 points. It may be noted that the system, by default, removes the number of additional points from the farthest point cluster to meet a minimum number of location data points present in the farthest point cluster. In the above example, the minimum number is 45 location data points, and the maximum number is 50 points. In an embodiment, a user may change the above logic to the maximum number of points.

The system then iteratively forms a new farthest point cluster by excluding the second set of location data points from the plurality of location data points until all the location data points are divided into a cluster and until each cluster has the target number (or range) of location data points. In other words, the system continuously forms the new farthest point cluster by repeating the steps mentioned in earlier paragraphs.

Consider an example, there are 1000 location data points present in an area. The system creates a farthest point cluster comprising 45 points. It may be noted that the range of location data points is 45-50. After creating the farthest point cluster the system excludes the 45 points present in the farthest point cluster. Further, the system determines a centroid of the remaining 955 points. It may be noted that the system repeats all the steps in order to form a new farthest point cluster (second farthest point cluster) that meets the range of location data points. In the next iteration, the system performs a similar analysis on 910 points (955-45) to form a third farthest point cluster. It may be noted that the system iteratively forms the new farthest point cluster until all the points are added to a cluster. One or more farthest point clusters may also be called a set of clusters. In the above example, the system forms 22 farthest point clusters, each comprising at least 45 points. Further, 10 points out of 1000 points are left out.

Further, the system calculates a centroid of each cluster from the set of clusters to rebalance at least a location data point present in one cluster to an adjacent cluster. The centroid of the cluster is calculated by taking an arithmetic mean of latitude and longitude coordinates of location data points present in the cluster. After calculating the centroid of the cluster, the system determines the distance of each location data point from the centroid of the cluster. Further, the system sorts the location data points based on the distance. Further, the system calculates an average distance between the centroid and the location data points. Similarly, the system calculates the centroid of the set of clusters and sorts the location data points present in the cluster based on the distance. When the distance between the location data point and the centroid of the cluster is greater than an average distance, the system may calculate distance of the location data point from the centroid of the adjacent cluster. When the distance of the location data point from the centroid of the adjacent cluster is less than the distance between the location data point and the centroid of the cluster, the system may rebalance the location data point to the adjacent cluster. It may be noted that rebalancing the location data point to the adjacent cluster helps to create dense clusters in the area.

Figure 4A:
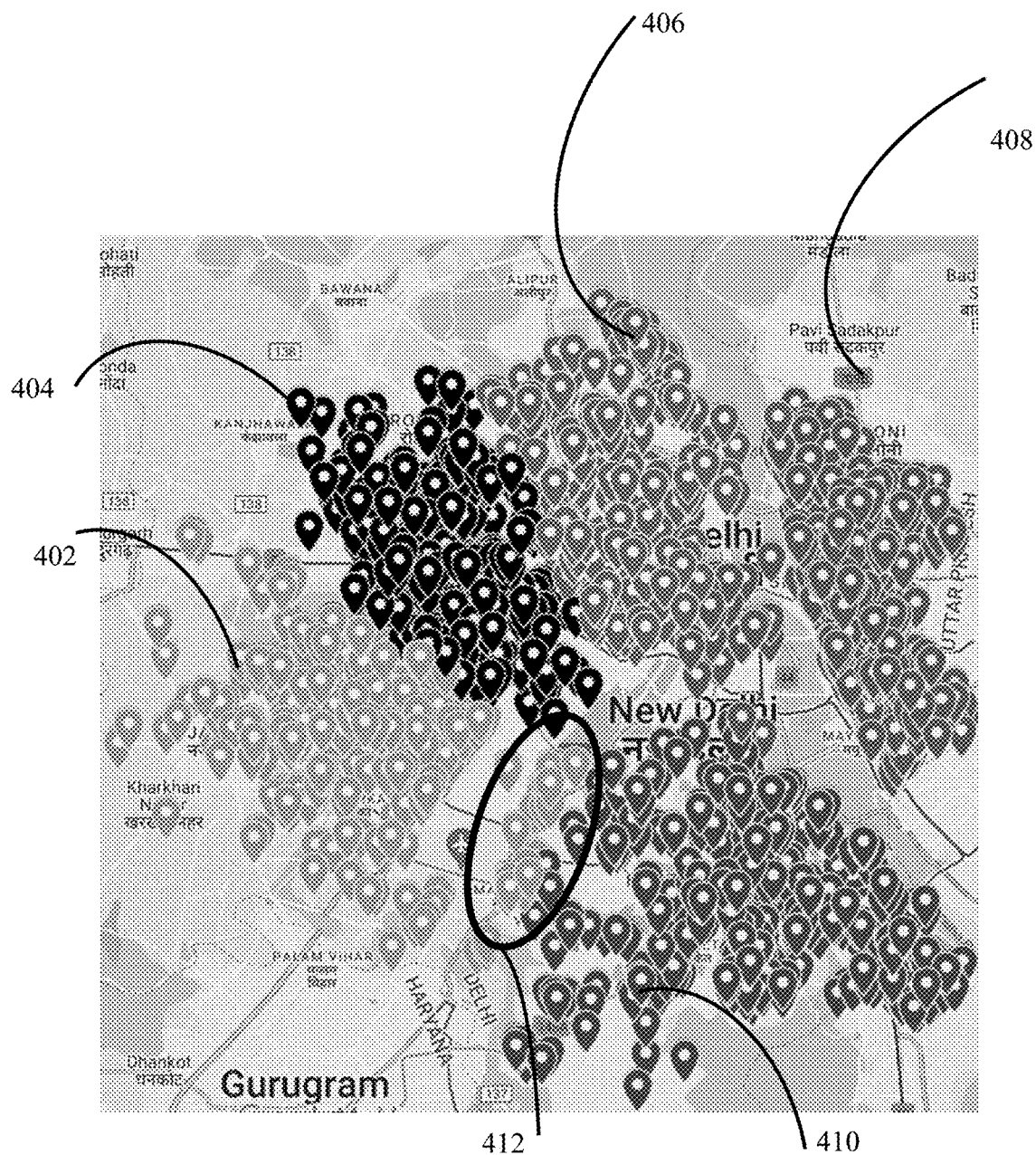
FIG. 4A illustrates a first example of rebalancing of location data points present in a cluster to an adjacent cluster, in accordance with an embodiment of the present subject matter.
Figure 4B:
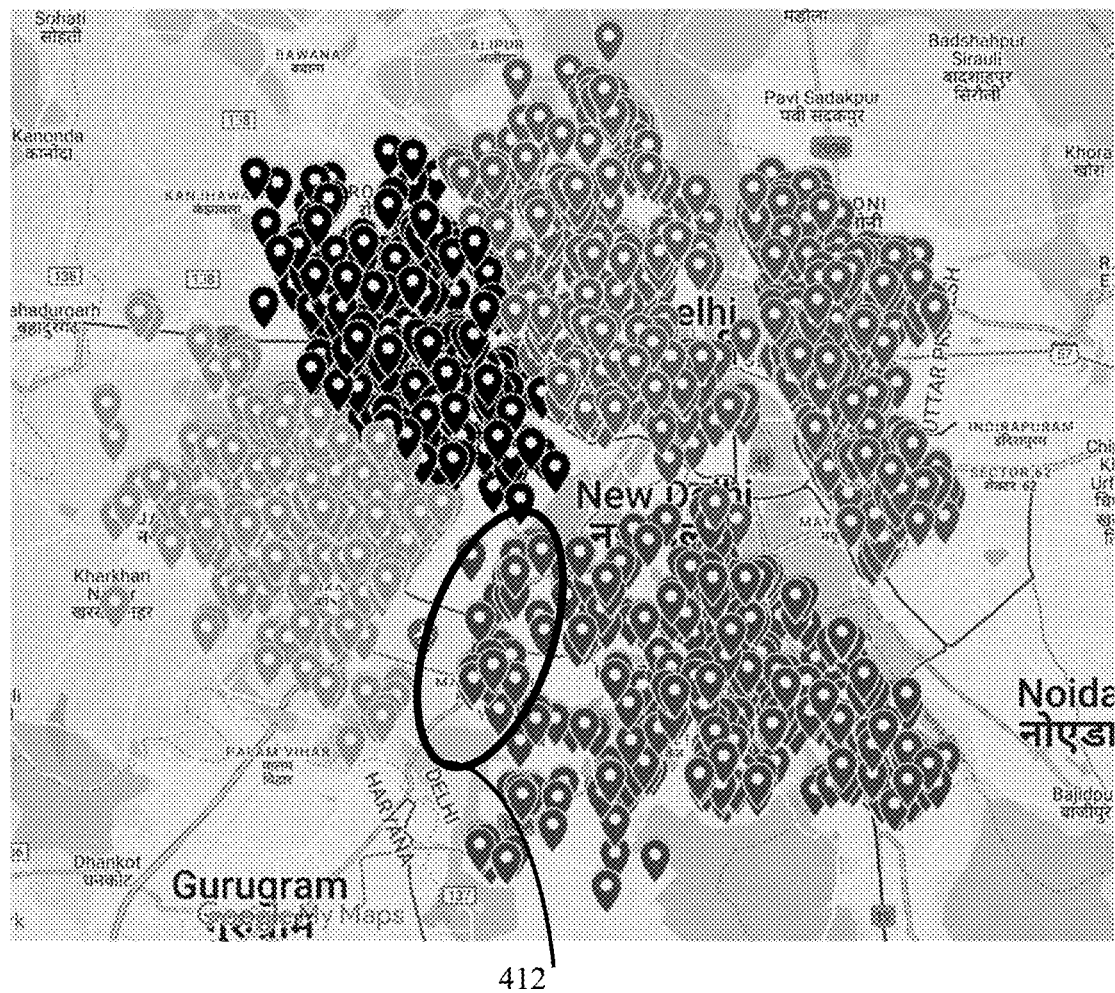
FIG. 4B illustrates a second example of rebalancing of location data points present in a cluster to an adjacent cluster, in accordance with an embodiment of the present subject matter.

Referring to FIGS. 4A and 4B, five clusters (402, 404, 406, 408, and 410) are shown. It can be seen in FIG. 4A that the left bottom cluster 402 covers a wider area. In order to create dense clusters, the system may rebalance the location data point present in cluster 402 to the adjacent cluster. The highlighted area 412 shown in FIG. 4A shows location data points having a higher average distance from the centroid of cluster 402. Further, the system calculates a distance between the location data points present in the highlighted area 412 with a centroid of an adjacent cluster 410. When the distance between the location data points presents in the highlighted area 414 and the centroid of the adjacent cluster 410 is less when compared to cluster 402, the system may transfer the location data points present in the highlighted area 412 to the adjacent cluster 410. FIG. 4B shows that the location data points are transferred to the adjacent cluster 410. The below table shows the distance between the location data points with respect to cluster 402 and adjacent cluster 410.

| Location Data Points in the highlighted area 412 | Distance between the centroid of cluster 402 and the location data points present in the highlighted area | Distance between the centroid of adjacent cluster 410 and the location data points present in the highlighted area |
| --- | --- | --- |
| Point P | 15 km | 10 km |
| Point Q | 16 km | 09 km |
| Point R | 15.5 km | 9.5 km |

Referring to FIG. 4B, it may be noted that because of rebalancing of the cluster 402, cluster 402 became dense. Further, the system continuously iterates the above process till all the clusters (402, 404, 406, 408, and 410) are rebalanced.

Figure 2A:
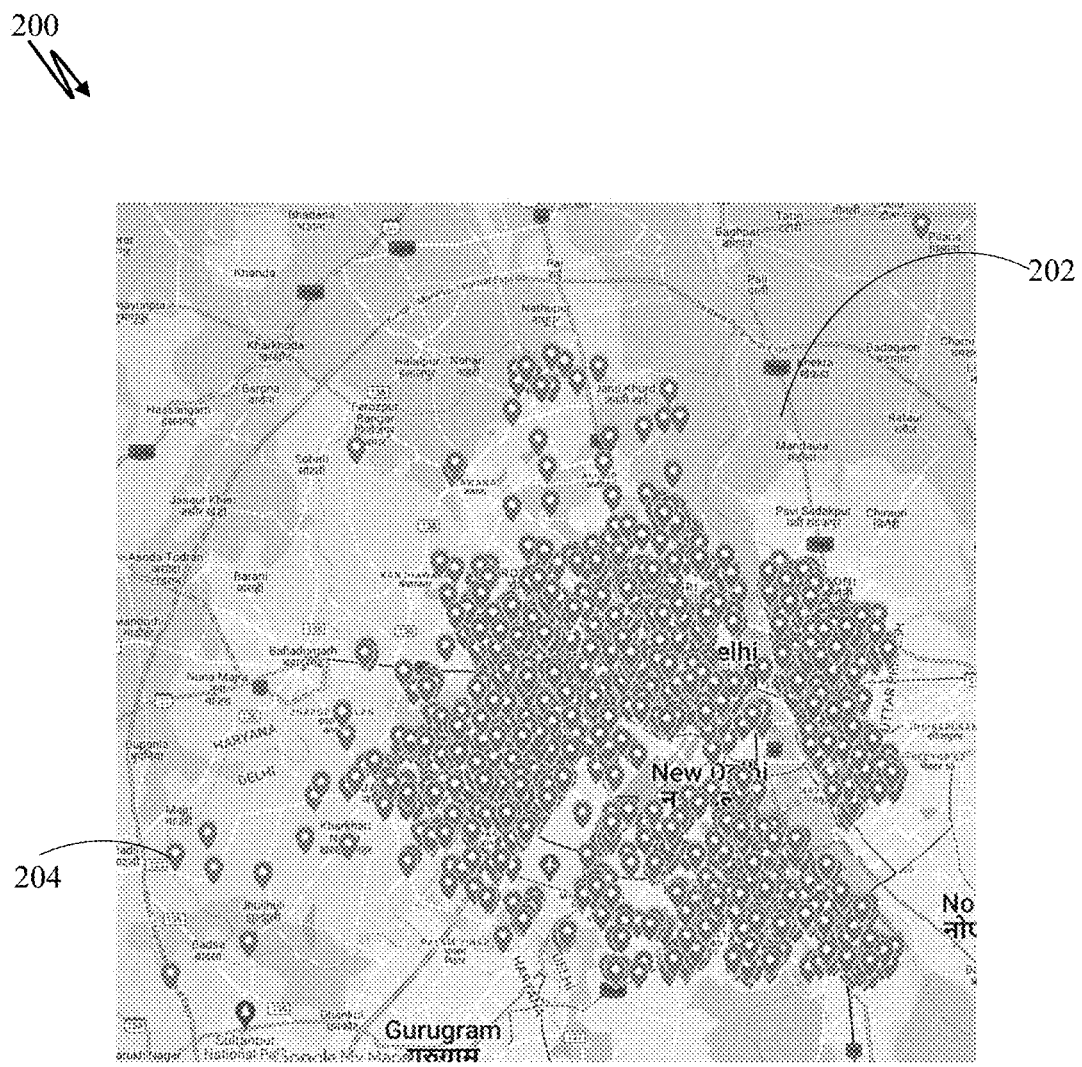
FIG. 2A illustrates a first example for creating clusters in an area, in accordance with an embodiment of the present subject matter.

Referring now to FIG. 2A, a plurality of location data points associated with a user device in an area are shown, in accordance with an embodiment of the present subject matter. In one example, the area 202 may be a geographical area of New Delhi. Further, a location data point 204 related to each user device may be present in the area 202. The location data point 204 may comprise the geographic coordinates comprising a latitude and a longitude.

Figure 2B:
FIG. 2B illustrates a second example for creating clusters in an area, in accordance with an embodiment of the present subject matter.

Referring now to FIG. 2B, a centroid 206 of the plurality of location data points is shown. The centroid 206 is calculated by taking arithmetic mean of longitudes and latitudes of the plurality of location data points. It may be noted that the centroid 206 is an imaginary or a real location data point representing the centre of the of the plurality of location data points present in the area 202.

Figure 2C:
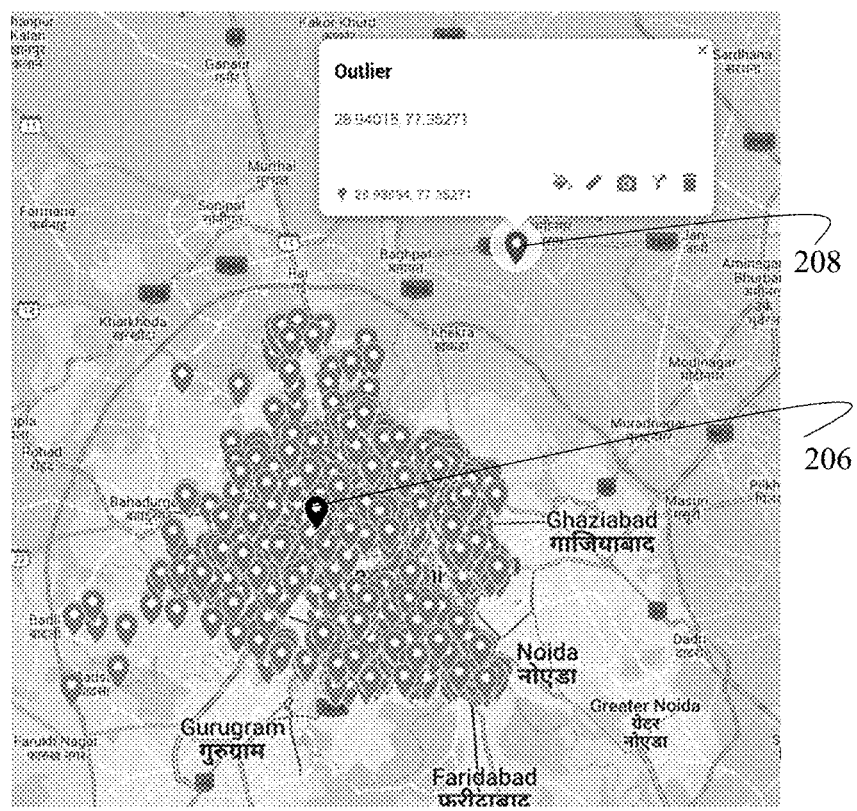
FIG. 2C illustrates a third example for creating clusters in an area, in accordance with an embodiment of the present subject matter.

Referring now to FIG. 2C, an outlier 208 present in the area is shown. The outlier 208 is a location data point having the angular distance greater than a threshold average angular distance. It may be noted that the threshold average angular distance may be calculated automatically or manually. In the figure, the average angular distance between the centroid 206 and the outlier 208 is more than the threshold average angular distance.

Figure 2D:
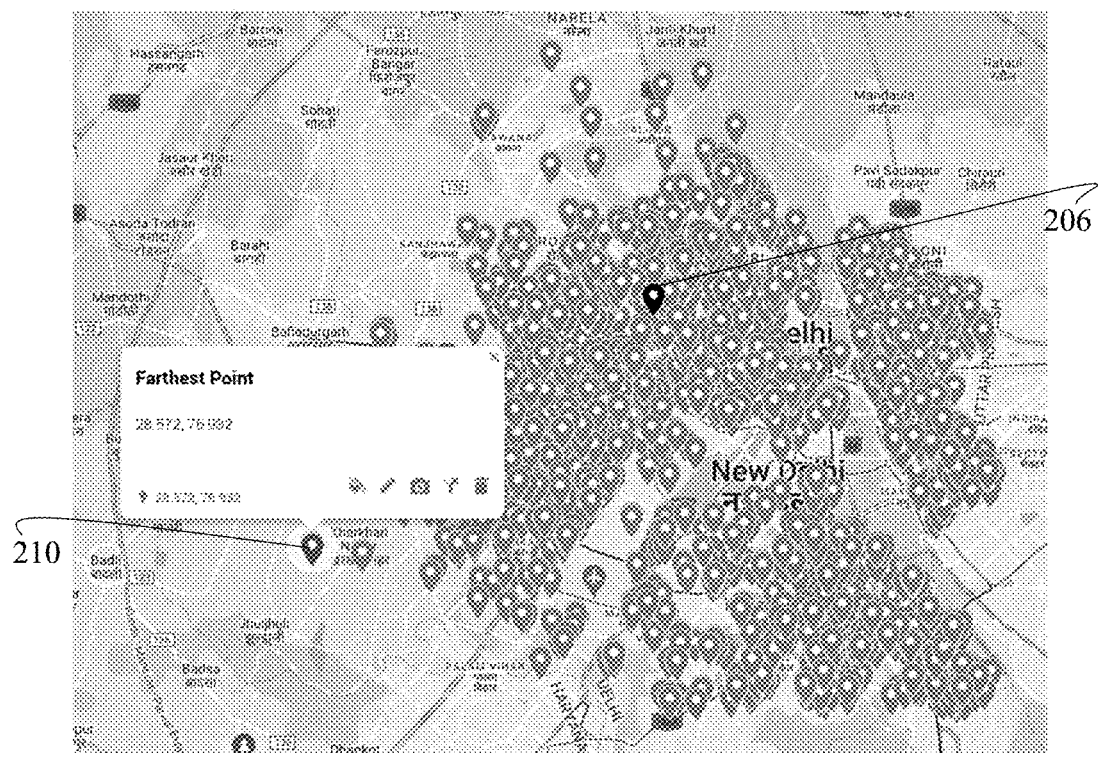
FIG. 2D illustrates a fourth example for creating clusters in an area, in accordance with an embodiment of the present subject matter.

Referring to FIG. 2D, a farthest location data point 210 from the centroid is shown. In order to determine the farthest location point 210, angular distance of the plurality of location data points from the centroid 206 may be calculated and then the farthest location data point 210 from the centroid based on the angular distance is determined.

Figure 2E:
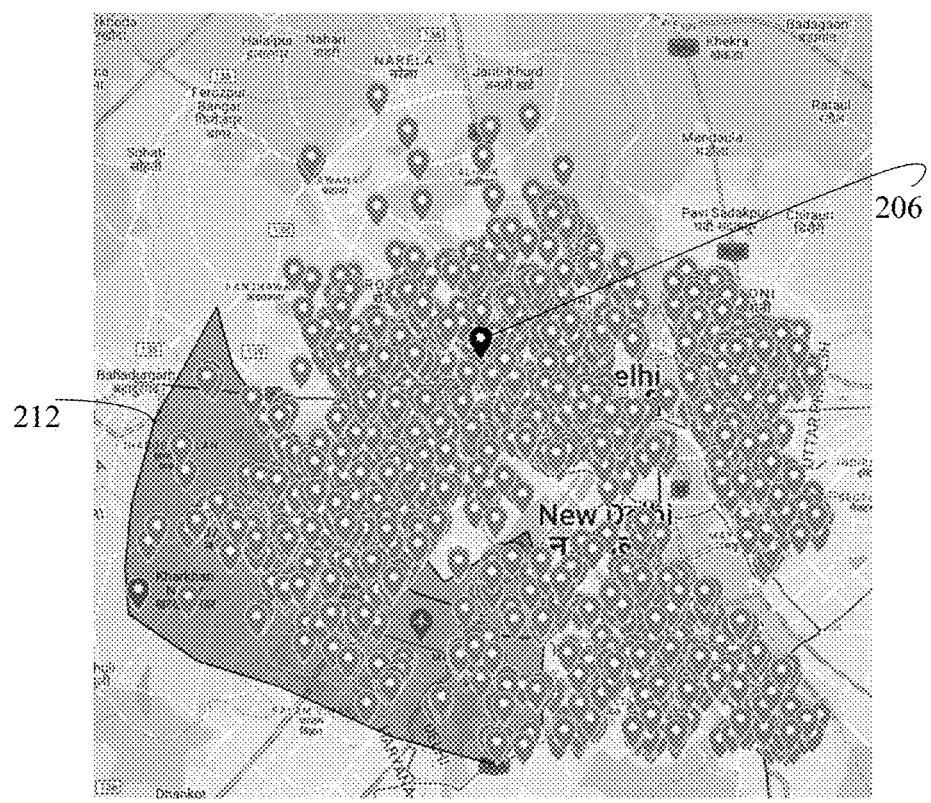
FIG. 2E illustrates a fifth example for creating clusters in an area, in accordance with an embodiment of the present subject matter.

Referring to FIG. 2E, a farthest point cluster 212 in the area is shown. The farthest point cluster, as shown, comprises Two Hundred and Thirty location data points having a centroid distance lesser than a farthest distance.

Figure 3:
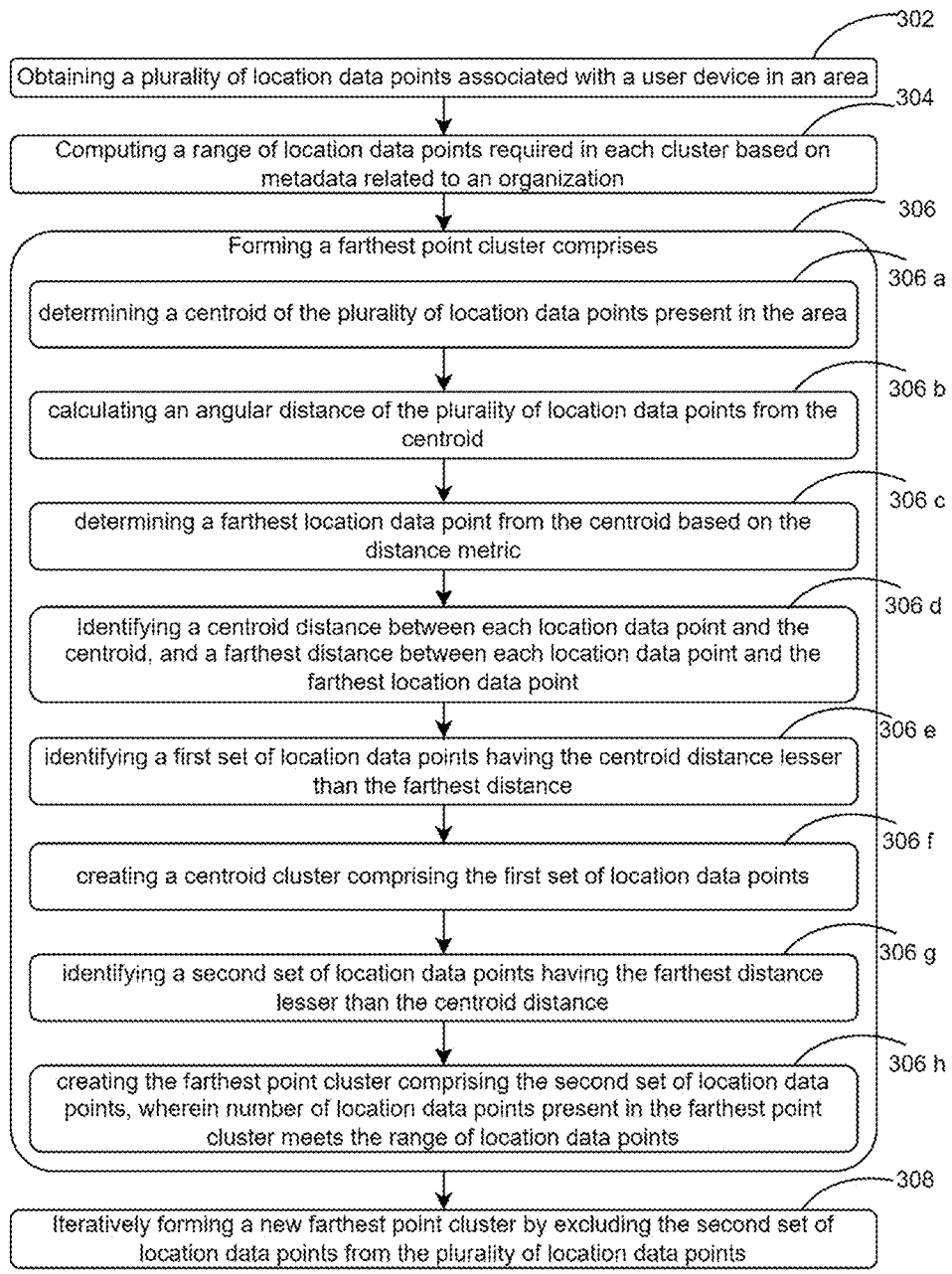
FIG. 3 illustrates a method for creating clusters in an area, in accordance with an embodiment of the present subject matter.

Referring now to FIG. 3, a method 300 for creating clusters in an area is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 300 or alternate methods for creating clusters in an area. Additionally, individual blocks may be deleted from the method 300 without departing from the scope of the subject matter described herein. Furthermore, the method 300 for creating clusters in an area can be implemented in any suitable hardware, software, firmware, or combination thereof. However, for ease of explanation, in the embodiments described below, the method 300 may be considered to be implemented in the above-described system 102.

At block 302, a plurality of location data points associated with a user device in an area may be obtained. It may be noted that each location data point includes geographic coordinates.

At block 304, a range of location data points required in each cluster based on metadata related to an organization may be computed.

At block 306, a farthest point cluster may be formed by:

At block 306 a, a centroid of the plurality of location data points present in the area may be determined.

At block 306 b, an angular distance of the plurality of location data points from the centroid may be calculated.

At block 306 c, a farthest location data point from the centroid based on the angular distance may be determined.

At block 306 d, a centroid distance between each location data point and the centroid, and a farthest distance between each location data point and the farthest location data point may be identified.

At block 306 e, a first set of location data points having the centroid distance lesser than the farthest distance may be identified.

At block 306 f, a centroid cluster comprising the first set of location data points may be created.

At block 306 g, a second set of location data points having the farthest distance lesser than the centroid distance may be identified.

At block 306 h, the farthest point cluster comprising the second set of location data points may be created. It may be noted that number of location data points present in the farthest point cluster meets the range of location data points.

At block 308, a new farthest point cluster may be iteratively formed by excluding the second set of location data points from the plurality of location data points.

Exemplary embodiments discussed above may provide certain advantages. Though not required to practice aspects of the disclosure, these advantages may include those provided by the following features.

Some embodiments of the system and the method enables creating equal size clusters in an area.

Some embodiments of the system and the method enables determining outliers in the area.

Some embodiments of the system and the method enables identifying serviceable areas for an organization to serve the customers efficiently.

Some embodiments of the system and the method enables creating dense clusters in an area by rebalancing a set of clusters.

Some embodiments of the system and the method provide an efficient way for customer segmentation.

Some embodiments of the system and the method enables receiving feedback from the human to continuously train the Machine Learning Algorithms to efficiently compute the range of location data points.

Although implementations for methods and system for creating clusters in an area have been described in language specific to structural features and/or methods, it is to be understood that the appended claims are not necessarily limited to the specific features or methods described. Rather, the specific features and methods are disclosed as examples of implementations for creating clusters in an area.

The invention claimed is:

1. A method to create non-overlapping clusters in an area to facilitate customer segmentation and distribution within the area to optimize logistic operations, the method comprising:
   receiving, via a user interface comprising a side panel, a user-defined input comprising a required number of clusters and a numerical range of location data points required in a cluster;
   obtaining, by a processor, a plurality of location data points in an area, wherein the plurality of location data points comprises geographic coordinates;
   forming a farthest point cluster comprising:
      determining, by the processor, a centroid of the plurality of location data points present in the area;
      calculating, by the processor, an angular distance of each of the plurality of location data points from the centroid;
      determining, by the processor, a farthest location data point from the centroid based on the angular distance;
      identifying, by the processor, a distance between each location data point and the centroid, wherein the distance between each location data point and the centroid is referred to as a centroid distance, and a distance between each location data point and the farthest location data point, wherein the distance between each location data point and the farthest location data point is referred to as a farthest distance;
      identifying, by the processor, a first set of location data points having the centroid distance lesser than the farthest distance;
      creating, by the processor, a centroid cluster comprising the first set of location data points;
      identifying, by the processor, a second set of location data points having the farthest distance lesser than the centroid distance;
      creating, by the processor, a farthest point cluster comprising the second set of location data points, wherein a number of the second set of location data points in the farthest point cluster meets the numerical range of location data points;
   forming, by the processor, one or more new farthest point clusters by excluding location data points present in the farthest point cluster from the plurality of location data points;
   displaying, by the processor, the one or more clusters visually on the interactive user interface, wherein each cluster is visually distinguished by indicia, and wherein the one or more clusters are non-overlapping and configured to facilitate customer segmentation and distribution within the area;
   assigning, via the interactive user interface, at least one sales agent to each of the clusters, wherein the processor dynamically associates each assigned sales agent with their respective cluster;
   displaying visually, on the interface, the assignment of sales agents within each cluster, wherein the assignment of sales agents to clusters optimizes service delivery and resource distribution within each defined geographic service area;
   initiating, by the processor, a cluster rebalancing process when the user, via the interactive user interface, modifies the user defined input, wherein the cluster rebalancing process comprises reinitiating forming the farthest point cluster based on the modified user defined input;
   displaying dynamically, on the user interface, the one or more rebalanced clusters resulting from the rebalancing process;
   reassigning, based on subsequent user selections via the interface, at least one sales agent to each dynamically rebalanced cluster, wherein the assignments and the dynamically rebalanced clusters are visually updated and displayed on the geographic map interface to reflect optimized agent distribution and improved logistic efficiency; and
   reassigning, based on user selection through the interface, at least one sales agent to each dynamically rebalanced cluster, wherein the assignments and rebalanced clusters are visually updated and displayed on the user interface to reflect optimized agent assignment and improved logistic efficiency.

2. The method as claimed in claim 1, further comprises computing an average angular distance between the plurality of location data points from the centroid.

3. The method as claimed in claim 2, wherein computing the average angular distance comprises determining a minimum outlier threshold by identifying a number of location data points, of the plurality of location data points, having the angular distance greater than a threshold average angular distance.

4. The method as claimed in claim 3, wherein the second set of location data points are removed from the farthest point cluster when the number of location data points in the farthest point cluster is less than the minimum outlier threshold.

5. The method as claimed in claim 1, further comprising determining that the number of location data points present in the farthest point cluster is less than the numerical range of location data points by identifying a difference in the number of location data points in the farthest point cluster based on the numerical range of location data points;

sorting the first set of location data points present in the centroid cluster in ascending order of the farthest distance;

determining one or more location data points present in the centroid cluster having a lesser farthest distance, wherein the one or more location data points are determined based on the difference; and adding the one or more location data points from the centroid cluster to the farthest point cluster to meet the range of location data points.

6. The method as claimed in claim 1, further comprising determining that the number of location data points present in the farthest point cluster is more than the range of location data points by computing a number of additional location data points present in the farthest point cluster based on the numerical range of location data points;

sorting the second set of location data points, present in the farthest point cluster, having a higher farthest distance; and removing one or more additional location data points having a higher farthest distance from the farthest point cluster to create the farthest point cluster that meets the range of location data points.

7. The method as claimed in claim 1, further comprises calculating a centroid of each cluster from a set of clusters to rebalance at least a location data point present in one cluster to an adjacent cluster.

8. The method as claimed in claim 1, wherein the angular distance is calculated using at least Haversine distance and Euclidian distance.

9. A system to create non-overlapping clusters in an area to facilitate customer segmentation and distribution within the area to optimize logistic operations, the system comprising:

a memory; and a processor coupled to the memory, wherein the processor is configured to execute program instructions stored in the memory for:

receiving, via a user interface comprising a side panel, a user-defined input comprising a required number of clusters and a numerical range of location data points required in a cluster;

obtaining a plurality of location data points in an area, wherein the plurality of location data points comprises geographic coordinates;

forming a farthest point cluster comprising:
 determining a centroid of the plurality of location data points present in the area;
 calculating an angular distance of the plurality of each of the plurality of location data points from the centroid;
 determining a farthest location data point from the centroid based on the angular distance;
 identifying a centroid distance between each location data point and the centroid, and a farthest distance between each location data point and the farthest location data point;
 identifying a first set of location data points having the centroid distance lesser than the farthest distance;
 creating a centroid cluster comprising the first set of location data points;
 identifying a second set of location data points having the farthest distance lesser than the centroid distance;
 creating a farthest point cluster comprising the second set of location data points, wherein a number of the second set of location data points in the farthest point cluster meets the numerical range of location data points;

forming one or more new farthest point clusters by excluding location data points present in the farthest point cluster from the plurality of location data points;

displaying the one or more clusters visually on the interactive user interface, wherein each cluster is visually distinguished by indicia, and wherein the one or more clusters are non-overlapping and configured to facilitate customer segmentation and distribution within the area;

assigning, via the interactive user interface, at least one sales agent to each of the clusters, wherein the processor dynamically associates each assigned sales agent with their respective cluster;

displaying visually, on the interface, the assignment of sales agents within each cluster, wherein the assignment of sales agents to clusters optimizes service delivery and resource distribution within each defined geographic service area;

initiating a cluster rebalancing process when the user, via the interactive user interface, modifies the user defined input, wherein the cluster rebalancing process comprises reinitiating forming the farthest point cluster based on the modified user defined input;

displaying dynamically, on the user interface, the one or more rebalanced clusters resulting from the rebalancing process;

reassigning, based on subsequent user selections via the interface, at least one sales agent to each dynamically rebalanced cluster, wherein the assignments and the dynamically rebalanced clusters are visually updated and displayed on the geographic map interface to reflect optimized agent distribution and improved logistic efficiency; and reassigning, based on user selection through the interface, at least one sales agent to each dynamically rebalanced cluster, wherein the assignments and rebalanced clusters are visually updated and displayed on the user interface to reflect optimized agent assignment and improved logistic efficiency.

10. A non-transitory computer program product having embodied thereon a computer program for creating non-overlapping clusters in an area to facilitate customer segmentation and distribution within the area to optimize logistic operations, the computer program product storing instructions for:

receiving, via a user interface comprising a side panel, a user-defined input comprising a required number of clusters and a numerical range of location data points required in a cluster;

obtaining a plurality of location data points in an area, wherein the plurality of location data points comprises geographic coordinates;

forming a farthest point cluster comprising:
 determining a centroid of the plurality of location data points present in the area;
 calculating an angular distance of each of the plurality of location data points from the centroid;
 determining a farthest location data point from the centroid based on the angular distance;

identifying a centroid distance between each location data point and the centroid, and a farthest distance between each location data point and the farthest location data point;

identifying a first set of location data points having the centroid distance lesser than the farthest distance;

creating a centroid cluster comprising the first set of location data points;

identifying a second set of location data points having the farthest distance lesser than the centroid distance;

creating a farthest point cluster comprising the second set of location data points, wherein a number of the second set of location data points in the farthest point cluster meets the numerical range of location data points;

forming one or more new farthest point clusters by excluding location data points present in the farthest point cluster from the plurality of location data points;

displaying the one or more clusters visually on the interactive user interface, wherein each cluster is visually distinguished by indicia, and wherein the one or more clusters are non-overlapping and configured to facilitate customer segmentation and distribution within the area;

assigning, via the interactive user interface, at least one sales agent to each of the clusters, wherein the processor dynamically associates each assigned sales agent with their respective cluster;

displaying visually, on the interface, the assignment of sales agents within each cluster, wherein the assignment of sales agents to clusters optimizes service delivery and resource distribution within each defined geographic service area;

initiating a cluster rebalancing process when the user, via the interactive user interface, modifies the user defined input, wherein the cluster rebalancing process comprises reinitiating forming the farthest point cluster based on the modified user defined input;

displaying dynamically, on the user interface, the one or more rebalanced clusters resulting from the rebalancing process;

reassigning, based on subsequent user selections via the interface, at least one sales agent to each dynamically rebalanced cluster, wherein the assignments and the dynamically rebalanced clusters are visually updated and displayed on the geographic map interface to reflect optimized agent distribution and improved logistic efficiency; and reassigning, based on user selection through the interface, at least one sales agent to each dynamically rebalanced cluster, wherein the assignments and rebalanced clusters are visually updated and displayed on the user interface to reflect optimized agent assignment and improved logistic efficiency.

* * * * *